United States Patent [19]

Schuldt

[11] Patent Number: 4,673,097

[45] Date of Patent: Jun. 16, 1987

[54] ELECTRICAL BOX WITH INTEGRAL AIR AND MOISTURE BARRIER

[76] Inventor: Larry J. Schuldt, 145 Meadowlark, Shelley, Id. 83274

[21] Appl. No.: 867,651

[22] Filed: May 28, 1986

[51] Int. Cl.⁴ .............................................. H02G 3/08
[52] U.S. Cl. .................................... 220/3.5; 220/3.2; 220/3.3; 220/3.9
[58] Field of Search .................. 220/3.2, 3.3, 3.5, 3.6, 220/3.9

[56] References Cited

U.S. PATENT DOCUMENTS

| | | | |
|---|---|---|---|
| 2,426,800 | 9/1947 | Triplett | 220/3.5 X |
| 3,740,451 | 6/1973 | Schindler et al. | 220/3.2 X |
| 4,134,636 | 1/1979 | Kleinatland et al. | 220/3.9 X |
| 4,265,365 | 5/1981 | Boteler | 220/3.3 |
| 4,399,922 | 8/1983 | Horsley | 220/3.3 X |
| 4,408,696 | 10/1983 | Crosson | 220/3.6 |

Primary Examiner—Steven M. Pollard
Attorney, Agent, or Firm—Lynn G. Foster

[57] ABSTRACT

A molded synthetic electrical box formed of synthetic resinous material preferably using one-piece molding techniques is mountable in walls and ceilings for enclosing the ends of sheathed electrical conductors connected to a switch or socket within the hollow interior of the box. The electrical box has an integrally molded flange extending around the outside of the walls of the box and parallel to an open front face. The flange is set back from the open face so that the open face will be flush with the interior surface of an interior wall. The flange is capable of being secured to the wall material or to a vapor and air barrier of the building wall by, for example, a suitable adhesive so that moisture and air can not cross the box. The box is further provided with alignment spacers so that it can be alignedly mounted to a surface in a rigid building wall surface.

9 Claims, 7 Drawing Figures

ELECTRICAL BOX WITH INTEGRAL AIR AND MOISTURE BARRIER

FIELD OF INVENTION

This invention relates to a residential and industrial electrical junction and switch box of synthetic resinous material, which may be used in the wiring circuits of dwellings and other buildings and which includes novel features which form, in part, an air and moisture barrier.

PRIOR ART

In the past, various types of residential and industrial electrical switch boxes or receptacles are well known for providing accessability to electrical service, or control of electrical service, through appropriate sockets, switch plates and detachable, circuit making connections. Some of these have been widely used. Such conventional boxes are mounted in walls and ceilings during the construction of buildings to provide ready access to electrical power. More recently, some types of junction and switch boxes have been molded from some synthetic resinous material and provide the advantage of lighter, safer and more economical construction than the metal boxes made by older methods of fabrication. Since such boxes are not air tight and are mounted adjacent to holes in interior wall surfaces, they permit substantial quantities of air and moisture to pass through the wall.

Such boxes, including nail-fastened outlet boxes, such as that described in David W. Kinney, U.S. Pat. No. 3,176,869, have had as one of their objects the formation of a box using relatively simple mold shapes to facilitate ease of fabrication. As in the Kinney patent, such boxes accommodate the driving of nails through holes or receptacles provided in the box to fasten the box to a stud or other surfaces during construction.

Another prior art box is disclosed in Richard L. Robinson, et al., U.S. Pat. No. 3,895,732, which provides for break-out panels or knock-out windows. The Robinson patent discloses and relies upon a one shot two-part molding process and design for minimizing the propensity of polyvinyl chloride plastics, which bleed or emit substantial quantities of hydrogen chloride gas in the course of molding, to eat away the very fine shut-off points or lines along steel guide parts when forming spaces or openings surrounding the aforementioned knock-outs.

Prior art electrical boxes come in a plurality of shapes and sizes, but generally provide at least one flat wall surface which is attached flush to a stud or other suitable surface so as to project inwardly a distance substantially equal to the interior wall thickness. The interior face of the box comprises an opening to receive an appropriate electrical device, such as an electrical socket, switch or the like. Such prior art electrical boxes do not generally posses good insulating characteristics. It is commonplace for such boxes to allow transfer of air and moisture across the box.

This defect has become of increasing concern with rising fuel and power costs and the increase in awareness of energy conservation issues. To prevent external air from entering into and internal air from escaping from the interior of buildings, and to prevent moisture from crossing walls through electrical boxes, the prior art has proposed that a separate second generally transparent plastic container be used in conjunction with a conventional electrical box. Such a box is disclosed in G. Russel Bulkwill, U.S. Pat. No. 4,158,420. Such an independent container, however, substantially impedes and greatly increases the cost of installation of an electrical box.

BRIEF SUMMARY AND OBJECTS OF THE INVENTION

In brief summary, the present invention is directed to residential and commercial or industrial boxes suitable for use as electrical junction and switch boxes and which provide an improved wall insulation feature. Preferably, the present invention comprises electrical boxes formed of synthetic resinous material, such as one-shot molding of polyvinyl chloride. The construction of such a box from synthetic resinous material, in accordance with the present invention, includes formation of an integrally molded flange of suitable size to assist in inhibiting the passage of air through the wall across the box. Thus, the present invention forms a barrier for purposes of improved wall insulation. The flange accommodates direct impervious attachment to a barrier layer, such as plastic film, placed, for example, between the studs and the interior wall in a building. The box is provided with a open side, adjacent the mentioned flange, for receiving a suitable electrical device such as a socket, switch or other device. The mentioned flange is typically offset from the mentioned opening by a suitable distance substantially equal to the thicknesses of the interior wall. For example, dry wall which comes in a plurality of standard thicknesses such as $\frac{3}{8}''$, $\frac{1}{2}''$ or $\frac{5}{8}''$. The box is further provided with alignment spacers along one side of the box, suitable for spacing the box away from and aligning the box with a stud or other mounting surface.

With the foregoing in mind, it is a principal object of the present invention to provide a novel electrical junction and switch box.

It is a further significant object to provide an electrical box, which economically provides for significantly better insulation characteristics.

It is another important object of this invention to provide an electrical box comprising an integral flange suitable for inhibiting tranfer of air through a wall surface at the site of the box.

It is a further object of the present invention to provide alignment spacers so that the mentioned electrical switch box can be quickly, easily and alignedly mounted to a stud or other suitable surface.

It is a further object of the invention to provide a synthetic resinous electrical junction or switch box, and related method, with an integral, air flow inhibiting flange, having a geometry such that it can be quickly and easily molded in an integral structure by a one-shot molding process, using only two molds.

It is a further object of the invention to provide an integrally molded synthetic resinous electric junction or switch box with air and moisture flow inhibiting capabilities which can be quickly and easily placed in position ready for use, and which provides a durable, long lasting and effective service life.

These and other objects and features of the present invention will be apparent from the detailed description taken with reference to the accompanying drawings.

DETAILED DESCRIPTION OF THE ILLUSTRATED EMBODIMENT

Figure 1:
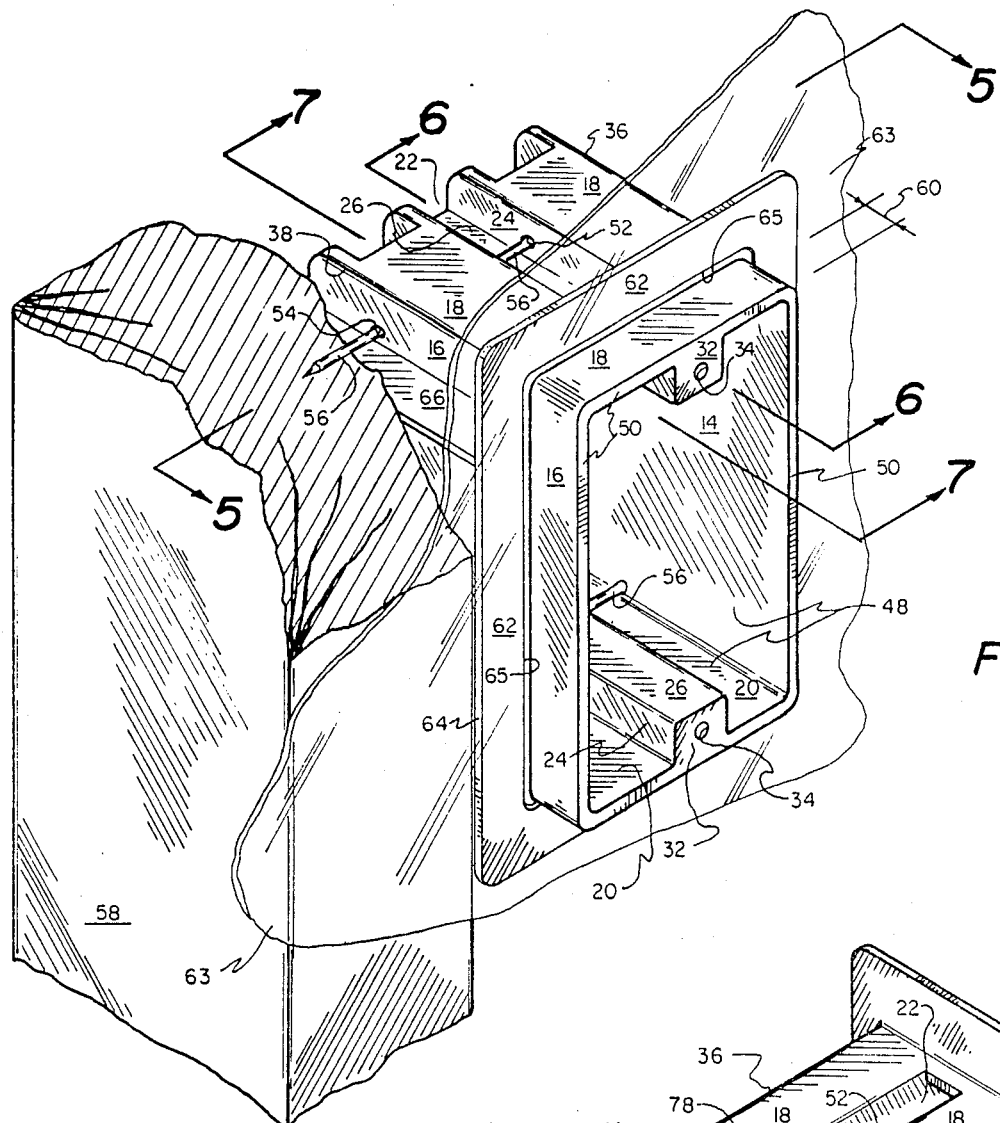
FIG. 1 is a three dimensional front perspective showing an electrical box, fabricated in accordance with the present invention, in its installed position.
Figure 3:
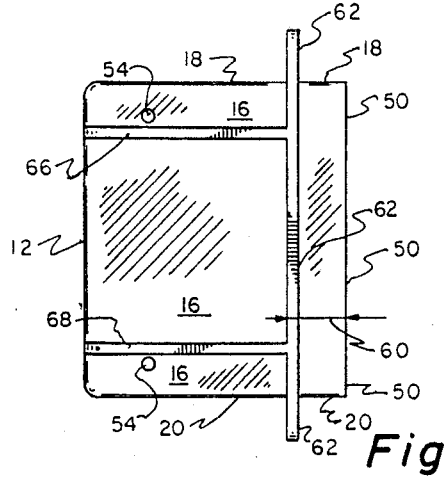
FIG. 3 is a side elevational of the box of FIG. 1, partially illustrating alignment spacers.

Reference is now made to the drawings, wherein like numerals are used to designate like parts throughout. Specific reference is made to FIG. 1, which comprises a perspective representation of a switch box, designated generally by the number 10, constructed in accorandance with the principles of the present invention. Box 10 comprises a plurality of integral walls, shown as being of uniform thickness throughout, the walls collectively defining an enclosure opened only at the front thereof.

In the illustrated embodiment of the invention, the mentioned walls comprise a back wall 12, a pair of parallel spaced side walls 14 and 16, and top and bottom parallel spaced walls 18 and 20. The top and bottom walls 18 and 20 comprise spaced segments interrupted by a generally U-shaped central groove 22 which runs from front to back.

Figure 5:
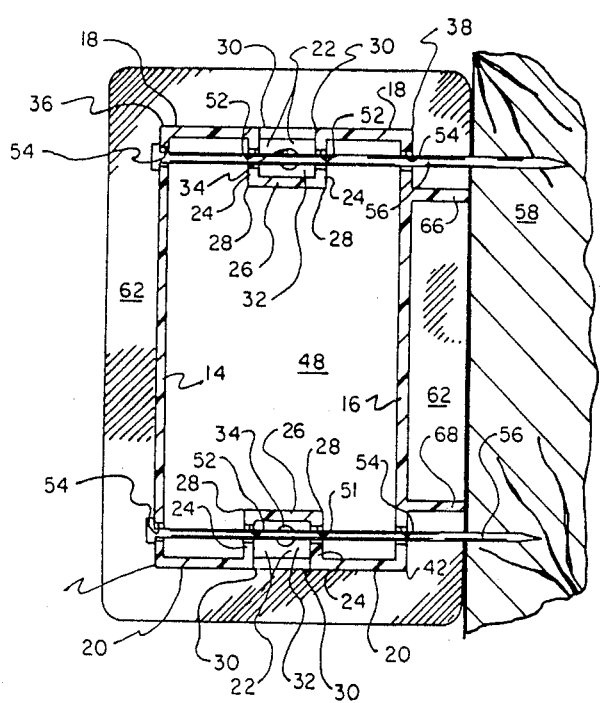
FIG. 5 is a cross section taken along lines 5—5 of FIG. 1.

The top and bottom U-shaped grooves 22 are best illustrated in FIG. 5. Each U-shaped groove comprises two relatively short vertical walls 24, spaced one from the other, and aligned in parallel relation with each other and with side walls 14 and 16 to define the width of groove 22, and a base wall 26, perpendicular to the associated walls 24 and parallel to but offset from the adjacent top or bottom wall 18, 20. The associated walls 24 and 26 are integral with each other and with right angle corners 28. The walls 24 associated with either groove 22 are integral with the associated top or bottom wall 18, 20, at right angle corners 30.

Each groove 22 terminates at a front abutment 32. Each abutment 32 is interrupted by central threaded bore 34, for purposes hereinafter explained. The threaded bore 34 in each abutment 32 is aligned with the associated groove 22. The associated walls 24 and 26, which form each groove 22, strengthen and stabilize the box 10.

The described walls 12, 14, 16, 18 and 20 are respectively substantially planar and are integrally connected to each other in perpendicular relationship at right angle corners 36, 38, 40, 42, 44 and 46. Thus, the overall configuration of the box 10 is cubical and interiorly hollow.

The open front of the box comprises an opening 48, defined by a front edge 50 located in a vertical plane (in the installed position). The edge 50 is located so that it will be flush with the ultimate interior wall surface, once the interior wall surface is installed or otherwise established. The interior of the box is generally hollow and sized and shaped to appropriately receive a conventional electrical socket or switch. Preferably, the volume of the box is 21.5 cubic inches, to serve the indicated purposes.

Figure 6:
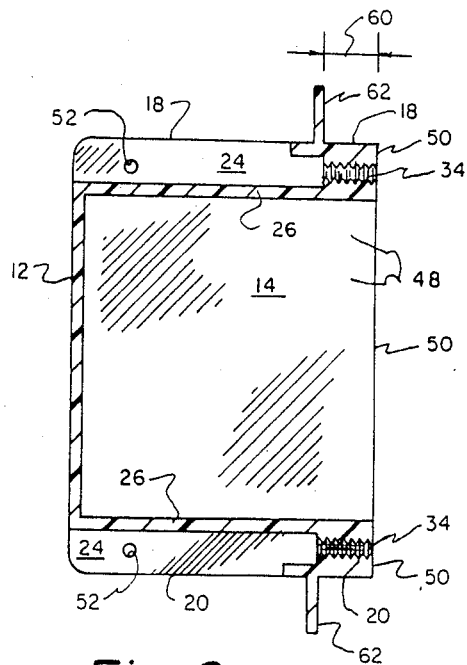
FIG. 6 is a cross section taken along lines 6—6 of FIG. 1.

At the heretofore indicated locations, box 10 is provided with the two threaded bores 34 (FIG. 6) for conventionally receiving screws by which the electrical socket or switch is secured in its proper position. A conventional switch plate or other closure plate (not shown) is in turn placed across the front opening 48 of the box and there screw-secured to a threaded bore conventionally carried centrally by the mentioned conventional socket or switch.

With further reference to FIG. 5, the adjacent parallel walls 24 forming each groove 22 are interrupted by aligned nail-receiving apertures 52. Each set of apertures 52 (top and bottom) are also aligned with nail-receiving apertures 54 existing in side walls 14 and 16. Thus, nails 56 will pass loosely and alignedly through each set of four aligned apertures 52 and 54, and, when the box 10 is placed in its installed position, the nails 56 are driven, using a conventional hammer or the like, into an adjacent stud 58. In this way, the box 10 is firmly anchored or secured in its proper installed position and shape-retaining condition.

The thickness of the interior wall is illustrated in FIGS. 1, 3, 6 and 7 and there identified by the numeral 60. This distance may vary, depending upon the particular material being used to form the interior wall and the thickness thereof. For example, the distance 60 may be $\frac{1}{2}''$, when $\frac{1}{2}''$ dry wall or sheet rock is being used.

The top, side and bottom walls 14, 16, 18 and 20 merge into and are integral with a peripheral flange 62, which defines the distance 60. The thickness of the flange 62 is relatively thin and may be essentially the same as the thickness of the aforementioned walls of the box 10. The flange 62 is, however, of sufficient strength and width to permit it to be securely bonded to a layer of Visqueen or other suitable impervious sheet material 63 used, as illustrated, to form a vapor and air barrier inside the stud wall and behind the interior wall. Direct bonding of flange 62 to the outside face of the interior wall is also an option, in some construction circumstances.

The flange 62 is, however, adapted to receive an appropriate adhesive or bonding substance permitting the box 10 to be sealed to the contiguous portion of the sheet 63 to prevent vapor and air leaks across the box 10. Currently, the preferred adhesive for securing the sheet 63 to the flange 62 is a commercially available product known as Trimco acoustic sealant glue. The flange 62 is located in a vertical plane, in the installed position, and, therefore, is parallel to the plane containing front edge 50. The exposed area of the flange 62 beyond the receptacle formed by the walls 14, 16, 18 and 20, is, to some extent, a matter of choice, but a large front surface area is desired for attachment of the plastic sheet barrier 63 adjacent aperture 65 therein. The dimensions of the flange 62 should not be excessively large, since it is contemplated that one vertical edge 64 will be stably contiguous with the parallel to one surface of the stud 58 forming part of the wall of a building.

In the presently preferred construction, boxes in accordance with the principles of the present invention are preferably formed as a single integral piece, using one-piece conventional molding techniques. Thus, flange 62 is formed integral with and projects perpendicular to the side, top and bottom walls 14, 16, 18, and 20. The flange 62 as well as the remainder of the box 10 is formed of sufficient size with suitable synthetic resinous material so that it has substantial structural integrity and is shape retaining. Currently, B. F. Goodrich PVC plastic compound 87241 is the preferred material for molding box 10.

In order for the flange 62 to accommodate installation so that the flange 62 is parallel with the interior wall and so that the side walls 14 and 16 are parallel to the adjacent wall comprising stud 58, structure comprising alignment spacers are normally provided at the exterior of at least one of the wall surfaces 14, 16. Spacers are not needed when the flange 62 is lapped upon the inside face of the stud 58.

Figure 2:
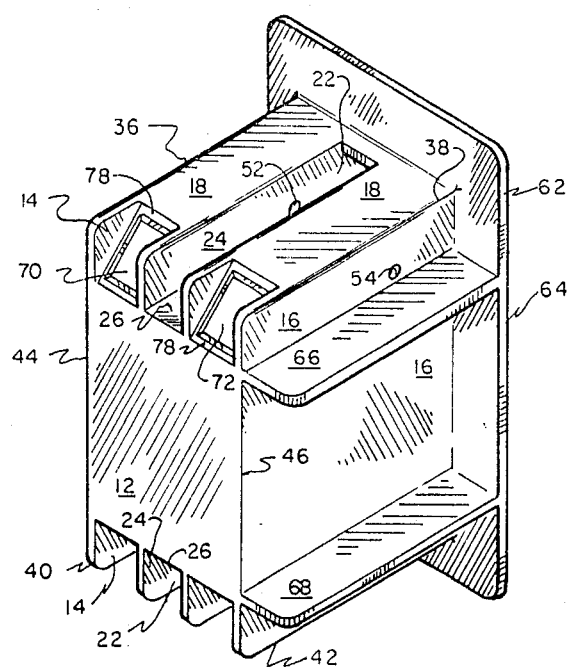
FIG. 2 is a perspective of the electrical box of FIG. 1 viewed from the back.

In the preferred embodiment, however, the spacer structure comprises two rigid planar ribs 66 and 68, respectively. These ribs are best illustrated in FIG. 2. Preferably, the spacer ribs 66, 68 are an integral molded part of the box 10. Spacer 66 and 68, as illustrated, are disposed parallel to each other, each in a horizontal plane, one near the top of the box 10 and the other near the bottom. The front-to-rear dimension of the spacer ribs 66, 68 is shown as being equal to the corresponding dimension of the box 10 from the rear of flange 62 to the back of the back wall 12. The width of the spacer ribs 66, 68 is illustrated as being the same as the exposed dimension of the flange 62. Thus, as best illustrated in FIG. 5, the spacer rib 66, 68 together with the flange 62, when the box 10 is installed, are contiguous with the stud 58 to which the box 10 is attached and cause the box 10 to be accurately and stably aligned with the stud 58 and the interior wall.

Figure 4:
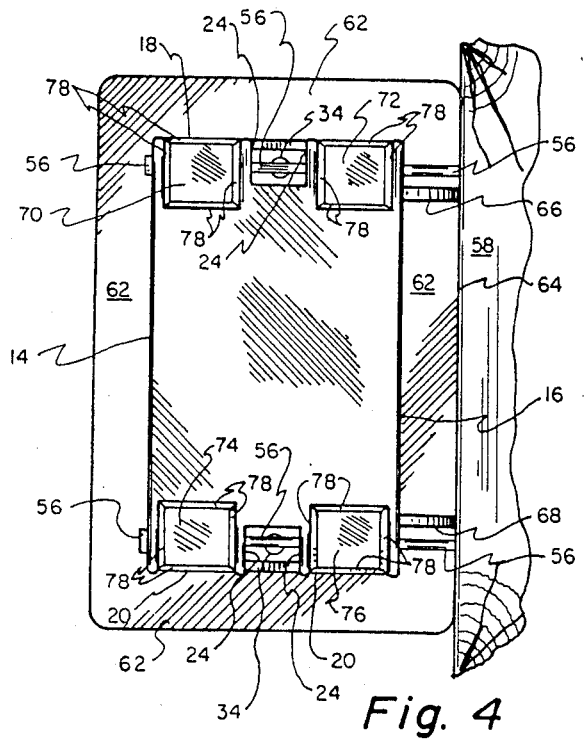
FIG. 4 is a rear elevation of the box of FIG. 1, showing the alignment spacers as well as nail passageways and knock-out plates.

With particular reference to FIG. 4, which is a rear view of the box 10, the box 10 is provided with sealed and impervious top and bottom knock-out plates 70, 72, 74, and 76. The dimensions and perimeter of each knock-out plate 70, 72, 74 and 76 is selected so that the sheathed wire or cable used to electrically connect the socket or plug [placed within the hollow interior of the box 10 will pass through the opening left by the removal of one of the knock-out plates in snug, air-tight and vapor-tight relation. While only four are illustrated, any number of desired knock-out plates may be used in conjunction with electrical boxes made in accordance with the principles of the present invention.

Figure 7:
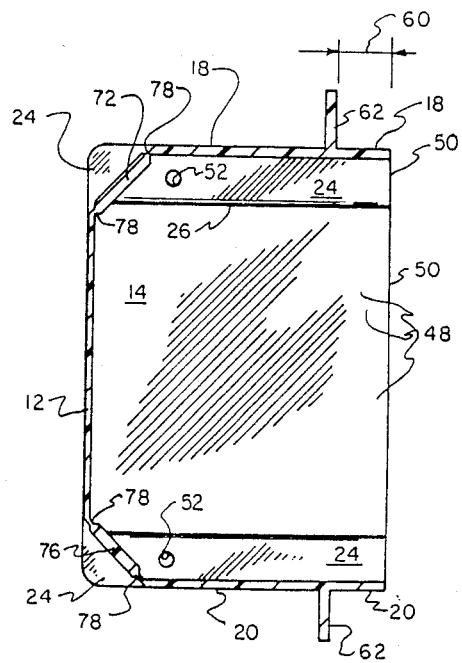
FIG. 7 is a cross section taken along line 7—7 of FIG. 1.

In the illustrated embodiment, the knock-out plates 70, 72, 74 and 76 are oriented diagonally between the back wall and either the top wall 18 or the bottom wall 20, as best shown in FIGS. 7. In the illustrated embodiment, the knock-out pieces 70, 72, 74 and 76 are illustrated as being generally rectangular, although other configurations may be used. Since each knock-out is substantially identical to all other knock-outs, in the illustrated embodiment, only one knock-out piece needs to be described.

As seen in FIG. 7, each knock-out piece 70, 72, 74 and 76 is essentially planar and has a central thickness substantially the same as the thickness of the walls forming the box 10. However, each knock-out piece is connected in air-tight, vapor-tight relation to the remainder of the box 10 around its entire perimeter by thin impervious web 78. Web 78 is frangible, because of its limited thickness, although when the associated knock-out piece is in place, web 78 is impermeable to both air and moisture. Typically, the installer of the box 10 will simply select one or more knock-out pieces for removal and will carefully strike the knock-out pieces to be removed with a hammer, punch or the like with sufficient force that the web or membrane 78 will fracture along web 78 around the entire parameter of the knock-out piece being removed.

It is to be noted that the side walls 14 and 16, as well as the groove 22 defining walls 24 and 26 have triangular flanges disposed adjacent the knock-out piece sites. Thus, when the box 10 is installed, the knock-out sites remain impervious to air flow and moisture penetration, independent of whether the knock-out piece in question remains intact with the box or has been removed and the appropriate sized wire force-fit through the aperture created along the web 78.

It is presently preferred that the alignment-spacer structure, illustrated herein and described as alignment ribs 66 and 68, be associated with just one of the two side walls. This is because the box is preferably symetrical and the box may, therefore, be merely inverted when it is desired to mount it to the left side of a stud, as opposed to the right of a stud.

The described configuration is highly desireable since it accommodates the formation of box 10 using synthetic resinous material molded in a two-part mold. This facilitates accurate manufacture and close control of reasonable costs.

The invention may be embodied in other specific forms without departing from the spirit or essential characteristics thereof. The present embodiments are, therefore, considered in all respects as illustrative and not restrictive, the scope of the foregoing description, and all changes which come within the meaning and range of equivalency of the claims are therefore intended to be embraced therein.

What is claimed and desired to be secured by United States Letters Patent is:

1. A one-piece electrical box impervious to passage of air and moisture between an exterior environment and an interior environment and in which commercial and residential electrical power is made available, the electrical box comprising:

side, top, bottom and back relatively thin integral wall means defining a sealed impervious receptacle open only at the front thereof and sized to receive an electrical switch, socket or the like:

knock out means initially forming an impervious integral part of the wall means, the knock-out means comprising frangible web means located and sized to create an aperture along the web means when the knock-out means are removed which aperture snugly and substantially imperviously receives a sheathed electrical wire to service the switch, socket or the like;

means integral with the wall means by which the box is internally secured to a building wall or like structure prior to the construction of an adjacent finish wall layer;

air and moisture barrier flange means having front surface means rearwardly offset from the front opening of the box by a distance substantially equal to the thickness of the yet to be constructed finish wall layer, the flange means extending transversely outwardly from the wall means, the flange means comprising an area adapted to be superimposed across and sealed directly or indirectly to the interior surface of the finish wall layer to create an imperviously sealed air and moisture site at the region between the front surface of the flange means and the back surface of the finish wall layer.

2. An electrical box according to claim 1 wherein the wall means, the knock-out means, the web means, the secured means and the flange means are of one-piece intergal molded construction formed of synthetic shape-retaining resinous material.

3. An electrical box according to claim 1 wherein the flange means are disposed in a single plane parallel to but offset from the front opening by a distance substantially equal to the thickness of the finish wall layer, the flange means being essentially perpendicular to at least some of the wall means.

4. An electrical box according to claim 1 further comprising box-alignment spacer means carried along the exterior of one side wall means of the box and extending outwardly a distance substantially equal to the outward dimension of the flange means.

5. An electrical box according to claim 4 wherein the box-alignment spacer means comprise a plurality of planar ribs extending front-to-back, each rib having substantially a uniform cross section throughout its length and an exposed side edge surface co-planar with one side edge surface of the flange means.

6. An electrical box according to claim 1 wherein the means by which the box is secured to the building wall or like structure comprise aligned nail-receiving aperture means integral with the wall means.

7. An electrical box according to claim 1 wherein the wall means comprise strengthening corrugated means.

8. a unitary electrical box impervious to displacement of interior and exterior air and moisture therethrough and in which commercial and residential electrical power is made available, the electrical box comprising:
relatively thin unitary wall means defining a sealed impervious receptacle open only at the front edge thereof and comprising anchor site means to receive an electrical switch, socket or the like;
knock out means initially forming an impervious unitary part of the wall means, the knock-out means comprising frangible web means located and sized to create an aperture along the web means when the knock-out means are removed which aperture snugly and substantially imperviously receives a sheathed electrical wire to service the switch, socket or the like;
means by which the box is secured to a building wall at the interior thereof prior to the construction of an adjacent finish building wall layer having an exposed surface and an interior concealed surface, the wall means of the box being adapted to project through an aperture in the finish building wall layer so that the edge of the opening of the receptacle is exposed flush with the exposed surface of the finish building wall layer;
sealing means extending transversely outwardly from the wall means at a distance to the rear of the edge of the opening substantially the same as the thickness of the finish building wall layer, the sealing site means being adapted to overlap the finish building wall layer adjacent the interior surface thereof to define an air and moisture barrier therebetween.

9. a unitary electrical box impervious to displacement of interior and exterior air and moisture therethrough and in which commercial and residential electrical power is made available, the electrical box comprising:
relatively thin unitary wall means defining a sealed impervious receptacle open only at the front edge thereof and comprising anchor site means to receive an electrical switch, socket or the like;
knock out means initially forming an impervious unitary part of the wall means, the knock-out means comprising frangible web means located and sized to create an aperture along the web means when the knock-out means are removed which aperture snugly and substantially imperviously receives a sheathed electrical wire to service the switch, socket or the like;
means by which the box is secured to a building wall at the interior thereof prior to the construction of an adjacent finish building wall layer having an exposed surface and an interior concealed surface, the wall means of the box being adapted to project through an aperture in the finish building wall layer so that the edge of the opening of the receptacle is exposed flush with the exposed surface of the finish building wall layer;
sealing means extending transversely outwardly from the wall means at a distance to the rear of the edge of the opening substantially the same as the thickness of the finish building wall layer, the sealing site means being adapted to overlap the finish building wall layer adjacent the interior surface thereof to define an air and moisture barrier therebetween;
box alignment spacer means carried along the exterior of a portion of the wall means of the box and extending outwardly a uniform distance substantially equal to the outward dimension of the sealing site means.

* * * * *